US012680515B2

(12) United States Patent
　　Dölker

(10) Patent No.:　US 12,680,515 B2
(45) Date of Patent:　　　Jul. 14, 2026

(54) CLOSED-LOOP CONTROL DEVICE FOR CLOSED-LOOP CONTROL OF A POWER ASSEMBLY INCLUDING AN INTERNAL COMBUSTION ENGINE AND A GENERATOR HAVING AN OPERATIVE DRIVE CONNECTION TO THE INTERNAL COMBUSTION ENGINE, CLOSED-LOOP CONTROL ARRANGEMENT HAVING SUCH A CLOSED-LOOP CONTROL DEVICE, POWER ASSEMBLY AND METHOD FOR CLOSED-LOOP CONTROL OF A POWER ASSEMBLY

(71) Applicant: Rolls-Royce Solutions GmbH, Friedrichshafen (DE)

(72) Inventor: Armin Dölker, Friedrichshafen (DE)

(73) Assignee: Rolls Royce Solutions GmbH, Friedrichshafen (DE)

( * ) Notice:　Subject to any disclaimer, the term of this patent is extended or adjusted under 35 U.S.C. 154(b) by 391 days.

(21) Appl. No.: 18/536,969

(22) Filed:　Dec. 12, 2023

(65)　　　Prior Publication Data

US 2024/0117776 A1　　Apr. 11, 2024

Related U.S. Application Data

(63) Continuation　of　application　No. PCT/EP2022/066834, filed on Jun. 21, 2022.

(30)　　Foreign Application Priority Data

Jun. 22, 2021　(DE) .................... 10 2021 206 426.4
Jun. 21, 2022　(WO) ................ PCT/EP2022/066834

(51) Int. Cl.
　　*F02D 29/06*　　　(2006.01)
　　*F02D 41/14*　　　(2006.01)
　　　　　　(Continued)

(52) U.S. Cl.
　　CPC ......... *F02D 29/06* (2013.01); *F02D 41/1401* (2013.01); *H02P 9/42* (2013.01); *H02P 2101/25* (2015.01); *H02P 2205/03* (2013.01)

(58) Field of Classification Search
　　CPC ................ F02D 29/06; F02D 41/1401; F02D 2041/1419; F02D 31/001; F02D 2250/18; H02P 9/42; H02P 2101/25; H02P 2205/03
　　See application file for complete search history.

(56)　　　　References Cited

U.S. PATENT DOCUMENTS 7,832,510 B2　11/2010　Hoshiba et al.
9,586,594 B2　3/2017　Wildgruber et al.
　　　　(Continued)

FOREIGN PATENT DOCUMENTS

DE　　　102 48 663 A1　5/2004
DE　10 2014 012 504 A1　1/2016

OTHER PUBLICATIONS

International Search Report and Written Opinion dated Dec. 1, 2022 for International Patent Application No. PCT/EP2022/066834 (15 pages).

*Primary Examiner* — Hung Q Nguyen
(74) *Attorney, Agent, or Firm* — TAYLOR & EDELSTEIN, PC

(57)　　　　ABSTRACT

A closed-loop control device includes: a power controller; a frequency controller for: detecting a generator frequency ($f_G$) as a controlled variable; determining a frequency control deviation ($e_f$) as a difference between the detected generator frequency ($f_G$) and a target generator frequency ($f_{soll}$); determining a second preset variable as a manipulated variable for controlling an internal combustion engine as a function of the frequency control deviation ($e_f$); and a switchover module for: using, in a first functional state, a first preset variable as a control preset variable for controlling the internal combustion engine; using, in a second (Continued)

functional state, the second preset variable as a control preset variable for controlling the internal combustion engine; wherein the power controller and the frequency controller can calculate a controller component for a respectively assigned preset variable during operation of the closed-loop control device, independently of a current functional state of the switchover module.

15 Claims, 7 Drawing Sheets

(51) Int. Cl.
    *H02P 9/42*          (2006.01)
    *H02P 101/25*     (2016.01)

(56)             References Cited

U.S. PATENT DOCUMENTS

| | | | |
|---|---|---|---|
| 10,066,539 B2 * | 9/2018 | Yamashita | F02B 39/10 |
| 11,012,016 B2 * | 5/2021 | Schweitzer, III | F02D 31/007 |
| 11,187,165 B2 * | 11/2021 | Hecker | F02D 29/06 |
| 2007/0228735 A1 * | 10/2007 | Becker | H02P 29/0016 |
| | | | 290/40 C |
| 2010/0019508 A1 | 1/2010 | Hashimoto et al. | |
| 2011/0062708 A1 | 3/2011 | Prochaska et al. | |
| 2014/0015257 A1 * | 1/2014 | Dobbs | F02D 41/0007 |
| | | | 290/40 B |
| 2021/0111651 A1 * | 4/2021 | Manson | F02B 63/04 |
| 2021/0111652 A1 | 4/2021 | Schweitzer, III et al. | |

* cited by examiner

1

CLOSED-LOOP CONTROL DEVICE FOR CLOSED-LOOP CONTROL OF A POWER ASSEMBLY INCLUDING AN INTERNAL COMBUSTION ENGINE AND A GENERATOR HAVING AN OPERATIVE DRIVE CONNECTION TO THE INTERNAL COMBUSTION ENGINE, CLOSED-LOOP CONTROL ARRANGEMENT HAVING SUCH A CLOSED-LOOP CONTROL DEVICE, POWER ASSEMBLY AND METHOD FOR CLOSED-LOOP CONTROL OF A POWER ASSEMBLY

CROSS REFERENCE TO RELATED APPLICATIONS

This is a continuation of PCT application no. PCT/EP2022/066834, entitled "CONTROL DEVICE FOR CONTROLLING A POWER ASSEMBLY, WHICH COMPRISES AN INTERNAL COMBUSTION ENGINE AND A GENERATOR DRIVINGLY CONNECTED TO THE INTERNAL COMBUSTION ENGINE, CONTROL ASSEMBLY COMPRISING SUCH A CONTROL DEVICE, POWER ASSEMBLY, AND METHOD FOR CONTROLLING A POWER ASSEMBLY", filed Jun. 21, 2022, which is incorporated herein by reference. PCT application no. PCT/EP2022/066834 claims priority to German patent application no. 10 2021 206 426.4, filed Jun. 22, 2021, which is incorporated herein by reference.

BACKGROUND OF THE INVENTION

1. Field of the Invention

The present invention relates to a closed-loop control device, and, more particularly, to a closed-loop control device for closed-loop control of a power assembly.

2. Description of the Related Art

Such a closed-loop control device can be designed to provided closed-loop control of a generator power or a generator frequency of a generator of a power assembly, which includes an internal combustion engine and a generator. Difficulties arise in particular if both the generator power and the generator frequency are to be controlled. If different closed-loop control devices are provided for this, there might not be a clear hierarchical ranking of the closed-loop control devices; in particular, it may be unclear whether the two closed-loop control devices are to be considered equal to one another or whether priority should be given to one of the two closed-loop control devices. This may lead to a less robust closed-loop control of the relevant variables. When switching between the different closed-loop control devices, undesirable jumps in the control of the power assembly may occur due to a lack of suitable coordination between the closed-loop control devices.

What is needed in the art is a closed-loop control device for closed-loop control of a power assembly including an internal combustion engine and a generator having an operative drive connection to the internal combustion engine, a closed-loop control arrangement including such a closed-loop control device, a power assembly including an internal combustion engine and a generator having an operative drive connection to the internal combustion engine, including a closed-loop control device of this kind or including a closed-loop control arrangement of this kind, and a method for closed-loop control of a power assembly of this kind, wherein the described disadvantages are at least reduced and optionally do not occur.

SUMMARY OF THE INVENTION

The present invention relates to a closed-loop control device for closed-loop control of a power assembly including an internal combustion engine and a generator having an operative drive connection to the internal combustion engine, to a closed-loop control arrangement including such a closed-loop control device, to a power assembly including an internal combustion engine and a generator having an operative drive connection to the internal combustion engine, including a closed-loop control device of this kind or including a closed-loop control arrangement of this kind, and to a method for closed-loop control of a power assembly of this kind.

The present invention provides a closed-loop control device for closed-loop control of a power assembly, including an internal combustion engine and a generator having an operative drive connection to the internal combustion engine. The closed-loop control device has a power controller which is set up to detect a generator power of the generator as a controlled variable, to determine a power control deviation as the difference between the detected generator power and a target generator power, and to determine a first preset variable as a manipulated variable for controlling the internal combustion engine as a function of the power control deviation. The closed-loop control device additionally has a frequency controller, which is set up to detect a generator frequency of the generator as a controlled variable, to determine a frequency control deviation as the difference between the detected generator frequency and a target generator frequency, and to determine a second preset variable as a manipulated variable for controlling the internal combustion engine as a function of the frequency control deviation. The closed-loop control device also has a switchover module which, in a first functional state of the switchover module, is set up to use the first preset variable as a control preset variable for controlling the internal combustion engine, and, in a second functional state of the switchover module, is set up to use the second preset variable as the control preset variable for controlling the internal combustion engine. The power controller and the frequency controller are set up to calculate at least one controller component for the preset variable assigned in each case, i.e., calculated by the respective controller, during operation of the closed-loop control device—in particular at all times—independently of the current functional state of the switchover module. Advantageously, the closed-loop control device proposed here allows a defined, clear and robust control strategy for the closed-loop control of both the generator frequency and the generator power. The switchover module is used here to decide—in particular at any time or for any time—whether the frequency controller or the power controller takes over control of the internal combustion engine as the currently controlling controller. The closed-loop control is therefore particularly robust, as only one of the controllers operates as the currently controlling controller at any given time. The switchover module also allows a clear specification of the hierarchy of the controllers, for example by achieving equal treatment of the two controllers through strictly time-equidistant switching, or by allowing a clear prioritization in favor of one of the controllers at any time, for example through different time intervals for switching from the frequency controller to the power controller on the one hand and from the power controller to the frequency controller on the other. By setting up the power controller and the frequency controller to calculate the at least one controller component for the respective preset variable during operation of the closed-loop control device, independently of the current functional state of the switchover module, it is advantageously possible to define at least one variable to be transferred between the controllers immediately before the switchover, by way of which undesirable jumps or discontinuities in the control of the internal combustion engine can be avoided during switchover. This can be advantageously designed in particular in such a way that the controller controlling immediately after the switchover calculates the preset variable assigned to it as if it had also been the controlling controller immediately before the switchover. In particular, this means that the currently controlling controller calculates the preset variable assigned to it in a sampling step immediately following the switchover—in the case of discrete-time sampling—as if it had also been the controller currently controlling in the immediately preceding sampling step before the switchover.

The currently controlling controller is understood here to be the controller, selected from the power controller and the frequency controller, of which the assigned preset variable is used as a control preset variable for controlling the internal combustion engine in the current functional state of the switchover module, i.e., in particular the controller that is currently selected by the switchover module for controlling the internal combustion engine. The currently non-controlling controller is understood to be the controller, selected from the power controller and the frequency controller, of which the assigned preset variable is not used as a control preset variable for controlling the internal combustion engine in the current functional state of the switchover module, i.e., in particular the controller that is currently not selected by the switchover module for controlling the internal combustion engine. The preset variable assigned to a controller is understood to mean, in particular, the preset variable calculated by the respective controller.

The closed-loop control device is optionally set up to work in discrete time, in particular to carry out its calculations in discrete time, i.e., in particular in clocked fashion. The resulting discrete points in time are also referred to here and in the following as sampling steps. The clocking is also referred to as sampling.

A power assembly is understood here in particular to be an arrangement consisting of an internal combustion engine and an electric machine operable as a generator, that is to say, a generator, wherein the internal combustion engine has an operative drive connection to the generator in order to drive the generator. Thus, the power assembly is set up in particular to convert chemical energy converted into mechanical energy in the internal combustion engine into electrical energy in the generator. The power assembly can be operated alone—in so-called island operation—or also together with a plurality of—in particular a small number of—other power assemblies in a network, i.e., in island parallel operation. However, it is also possible that the power assembly is operated on a, in particular, larger power grid or energy supply grid, in particular a supra-regional power grid, in grid parallel operation.

The switchover module can optionally be implemented in the closed-loop control device in terms of hardware, but optionally also in terms of software. In particular, the functionality of the switchover module can optionally be implemented in the closed-loop control device in terms of hardware and/or software. The switchover module does not necessarily have to be a separate, physically or notionally separable device or structure. In particular, the switchover module does not have to be designed as a switch or the like. It is merely important that a functionality is provided by the switchover module or by way of the switchover module, by way of which it is possible to switch between the first functional state and the second functional state, in particular irrespective of whether this functionality is provided by software or by suitable hardware.

The closed-loop control device is optionally set up to filter an instantaneous actual frequency of the generator and to use the filtered actual frequency as the detected generator frequency. This advantageously enables particularly quiet and therefore robust control. The instantaneous actual frequency is optionally measured directly at the generator. According to an optional embodiment, the instantaneous actual frequency is filtered using a $PT_1$ filter or mean value filter, wherein the detected generator frequency results from the $PT_1$ filter or mean value filter.

In the context of the present technical teaching, a generator frequency and correspondingly also the actual frequency is understood in particular to be the frequency of the electrical voltage induced in the generator, in particular the frequency of the electrical power voltage of the generator.

The closed-loop control device is alternatively or additionally optionally set up to filter an instantaneous actual power of the generator and to use the filtered actual power as the detected generator power. This advantageously enables particularly quiet and therefore robust control. The instantaneous actual power is optionally measured—optionally electrically—directly at the generator. According to an optional embodiment, the instantaneous actual power is filtered using a $PT_1$ filter or a mean value filter, wherein the detected generator power results from the $PT_1$ filter or mean value filter.

A closed-loop control device is understood to mean, in particular, a feedback control device. Correspondingly, a closed-loop control arrangement is understood to mean, in particular, a feedback control arrangement. Accordingly, an open-loop control device is understood to mean, in particular, a non-feedback control device.

In particular, a controller component is understood to be a proportional component, a differential component or an integral component of a controller.

According to a further development of the present invention, it is provided that the at least one controller component is selected from a group consisting of a proportional component and a differential component. In particular, by the currently non-controlling controller calculating the corresponding controller component, an interference-free transfer at the switchover time between the two controllers can be ensured. Optionally, the proportional component is calculated at all times—regardless of the functional state of the changeover module. Optionally, both controller components, i.e., the proportional component and the differential component, are calculated at all times, regardless of the functional state of the changeover module.

In an optional embodiment, all controller components are generally calculated by the frequency controller and the power controller at all times, optionally with the exception of an integral component for the currently non-controlling controller. In an optional embodiment, the currently non-controlling controller therefore calculates all controller components with the exception of its integral component. This is optionally initialized by an initialization variable in the manner described below.

According to a development of the present invention, it is provided that the closed-loop control device is set up to transfer the preset variable determined, in particular calculated, by the—currently—controlling controller to the—currently—non-controlling controller for initialization before the switchover module switches over. In this way in particular, a defined, optionally jump-free transfer between the controllers can be ensured.

According to a development of the present invention, it is provided that the closed-loop control device is set up to calculate an initialization variable for the initialization of the non-controlling controller from the transferred preset variable on the basis of the at least one controller component calculated by the non-controlling controller. In this way in particular, it can be advantageously ensured that a preset variable calculated by the then controlling controller in a sampling step immediately following the switchover is calculated as if this controller—and not the other controller—had also been the controlling controller in the previous sampling step immediately before the switchover.

In an optional embodiment, the initialization variable is calculated by subtracting the at least one controller component from the transferred preset variable. In an optional and particularly advantageous way, those controller components of the currently non-controlling controller that are not its integral component, in particular the proportional component and possibly the differential component, are thus subtracted from the transferred preset variable, so that the resulting initialization variable is a variable that would correspond to the instantaneous integral component of the currently non-controlling controller if it were the currently controlling controller.

According to a development of the present invention, it is provided that the closed-loop control device is set up to initialize an integral component of the non-controlling controller with the initialization variable. In particular in this way, it is advantageously ensured that the preset variable calculated immediately after the switchover by the then controlling controller is equal to a hypothetical preset variable which the then controlling controller would have calculated if it had already been the controlling controller immediately before the switchover. In particular, in the sampling step immediately following the switchover, the other controller components of the controller that is then controlling are added to the integral component initialized with the initialization variable, wherein the integral component initialized with the initialization variable—as explained above—corresponds to the hypothetical integral component that the controller that is then controlling would have if it had already been the controlling controller before the switchover. It should be noted that at the moment of switching, the two controllers swap their function as a non-controlling controller on the one hand and as a controlling controller on the other. This means that the switchover causes the previously non-controlling controller to become the controlling controller, wherein, conversely, the previously controlling controller becomes the non-controlling controller.

The closed-loop control device is optionally set up to calculate the same type of preset variable, i.e., in particular the same physical variable, in particular a torque or a speed, both for the first preset variable and for the second preset variable. This enables particularly efficient and smooth switching between the power controller and the frequency controller as the currently controlling controller by way of the switchover module.

According to a development of the present invention, it is provided that the closed-loop control device is set up to determine, in particular to calculate, a target torque as the first preset variable and as the second preset variable. This enables stable and robust control.

Alternatively, the closed-loop control device is optionally set up to determine, in particular calculate, a target speed as the first preset variable and as the second preset variable. This also enables stable and robust control.

According to a development of the present invention, it is provided that the closed-loop control device is designed as an open-loop control device for direct control of the internal combustion engine. This represents a particularly simple and cost-effective design of the closed-loop control device, wherein in particular no additional open-loop control device beyond the already existing open-loop control device is required. In an optional embodiment, the functionality of the closed-loop control device is implemented in the open-loop control device of the internal combustion engine in the form of a computer program product. This makes it particularly easy to retrofit an existing open-loop control device with the functionality according to the technical teaching presented here.

The open-loop control device is optionally an engine controller of the internal combustion engine. The open-loop control device is particularly optionally a so-called engine control unit (ECU). The engine controller or the ECU is optionally set up to calculate at least one energization duration for at least one fuel injection valve, in particular an injector, of the internal combustion engine on the basis of the control preset variable, in particular the target torque or the target speed.

If the closed-loop control device is designed as an open-loop control device, in particular an engine controller, and is set up for direct control of the internal combustion engine, it is possible that a speed control of the open-loop control device is active and is used in particular to calculate the energization duration for at least one fuel injection valve, in particular an injector which is provided for injecting fuel into at least one combustion chamber of the internal combustion engine, in particular depending on the target torque calculated as control preset variable or depending on a target torque calculated from the target speed calculated as control preset variable. However, it is also possible for the energization duration to be calculated from the target torque or the target speed with bypassing of a speed controller or without using a speed controller.

Alternatively, the closed-loop control device is optionally designed as a—in particular higher-level—generator controller, in particular with an interface to an open-loop control device of the internal combustion engine. In this case, the closed-loop control device optionally has an interface to an open-loop control device of the internal combustion engine. This represents a particularly flexible design of the closed-loop control device. In particular, the closed-loop control device can easily be used with a multiplicity of different existing power assemblies, especially by being connected upstream of an open-loop control device provided there and connected thereto via the interface. The closed-loop control device is optionally set up to transmit the control preset variable, in particular the target torque or the target speed, to the open-loop control device via an interface. The open-loop control device is optionally set up to calculate at least one energization duration for at least one fuel injection valve on the basis of the control preset variable.

In particular, a generator controller is understood to mean an open-loop control unit separate, i.e., in particular external, from the open-loop control device of the internal combustion engine, which unit is set up to control the generator, in particular to transmit the control preset variable to the open-loop control device of the internal combustion engine. In particular, a generator controller itself is not an open-loop control unit for the internal combustion engine, especially not a so-called engine control unit (ECU). In particular, the generator controller is provided in addition to the open-loop control device for the internal combustion engine, i.e., in addition to the open-loop control unit. The fact that the generator controller is optionally higher-level means that it is optionally connected upstream of the open-loop control device.

If the closed-loop control device designed as a—in particular higher-level—generator controller is used in combination with an open-loop control device of the internal combustion engine and with a target torque as control present variable, the open-loop control device is optionally operated with deactivated speed control or without speed control. In an optional embodiment, however, a final idling speed controller is activated in the open-loop control device. When the final idling speed controller is active, the speed of the internal combustion engine is subject to closed-loop control when the engine speed falls below a lower limit speed or exceeds an upper limit speed. Between the lower limit speed and the upper limit speed, the target torque used in the open-loop control device corresponds to the target torque specified by the generator controller and transmitted via the interface. In particular, a torque specification of the open-loop control device is activated in this configuration.

A suitable final idling speed controller is disclosed in particular in DE 102 48 633 B4.

In accordance with a development of the present invention, it is provided that the switchover module is set up to switch between the first functional state and the second functional state parameter-dependently. In an optional embodiment, the parameter used is in particular the time, in particular a period of time that has elapsed since the last switchover, or a number of sampling steps, in particular a number of sampling steps counted since the last switchover. In particular, the switchover module is set up to switch between the first functional state and the second functional state if the selected parameter exceeds a predetermined parameter limit value. The same parameter limit value can be selected for switching in both directions, wherein the two controllers are then operated with the same priority. However, prioritization between the controllers is also possible by using a first parameter limit value for switching from the power controller to the frequency controller, which differs from a second parameter limit value that is used for switching from the frequency controller to the power controller. Thus, the durations or numbers of sampling steps over which the different controllers operate as currently controlling controllers effectively differ, so that the higher-priority controller is active as the currently controlling controller for longer overall.

Alternatively, the switchover module is optionally set up to switch alternately, in particular cyclically, in particular after a specific cycle or a specific period, between the first functional state and the second functional state. In particular, it may be provided that the switchover module switches over after a fixedly predetermined period of time or after a fixedly predetermined number of sampling steps. In particular, it can be provided that the fixedly predetermined period or the fixedly predetermined number of sampling steps is the same for both switching directions.

Alternatively, the switchover module is optionally set up to switch between the first functional state and the second functional state according to a predetermined sequence. The predetermined sequence is in particular a predetermined pattern, in particular a temporal pattern or a pattern of sampling steps that have elapsed between two switching events. Such a pattern can, in particular, provide non-equidistant distributions for the different switching directions from the power controller to the frequency controller—and vice versa—in particular, therefore, different durations or different numbers of sampling steps before switching from the power controller to the frequency controller on the one hand and from the frequency controller to the power controller on the other.

In an optional embodiment, the switchover module is set up to prioritize in favor of the power controller, i.e., to use the first preset variable calculated by the power controller for a longer period of time overall—i.e., in particular in total over the operating time of the closed-loop control device—as a control preset variable for controlling the internal combustion engine. In particular, the changeover module is set up to allow a longer period of time or a larger number of sampling steps to elapse before the changeover from the power controller to the frequency controller, and vice versa before the changeover from the frequency controller to the power controller. This is advantageous because the generator frequency is typically a more stable variable that is more constant over time than the generator power, particularly in island parallel operation or in grid parallel operation of a power assembly equipped with the closed-loop control device.

According to a further development of the present invention, it is provided that the closed-loop control device is set up to calculate a preset variable additional term from the target generator power by way of a calculation element which has a differential—or differentiating—transmission behavior, and to offset the preset variable additional term with a precursor preset variable calculated by the power controller in order to obtain the first preset variable. In particular, the first preset variable is given a dynamic component. In this way, the control behavior of the power controller can be designed to be particularly dynamic. In particular, the load switching behavior of a power assembly including the closed-loop control device is improved. In particular, a frequency dip in the generator frequency is advantageously reduced in the event of a load connection.

In an optional embodiment, the calculation element is a D element or a $DT_1$ element.

Optionally, the power controller is set up to calculate the preset variable additional term from the target generator power by way of the calculation element, and to offset the preset variable additional term with the precursor preset variable in order to obtain the first preset variable.

In particular, the closed-loop control device, optionally the power controller, is optionally set up to add the preset variable additional term to the predecessor preset variable in order to obtain the first preset variable. This is a particularly simple way of calculating the first preset variable, taking into account the preset variable additional term.

The present invention also provides a closed-loop control arrangement for closed-loop control of a power assembly including an internal combustion engine and a generator having an operative drive connection to the internal combustion engine, said arrangement having a closed-loop control device designed as a—in particular higher-level—generator controller or a closed-loop control device designed as a—in particular higher-level—generator controller according to one or more of the previously described embodiments, wherein the closed-loop control arrangement has an open-loop control device operatively connected to the closed-loop control device for directly controlling the internal combustion engine, and wherein the closed-loop control device is set up to transfer the control preset variable to the open-loop control device. In particular, the advantages which have already been explained in conjunction with the closed-loop control device are provided in conjunction with the closed-loop control arrangement.

The present invention also provides a power assembly which has an internal combustion engine and a generator having an operative drive connection to the internal combustion engine. The power assembly also has a closed-loop control device according to the present invention or a closed-loop control device according to one or more of the embodiments described above, or the power assembly has a closed-loop control arrangement according to the present invention or a closed-loop control arrangement according to one or more of the previously described embodiments. The closed-loop control device or the closed-loop control arrangement is operatively connected to the internal combustion engine and the generator of the power assembly. In particular, the advantages which have already been explained in conjunction with the closed-loop control device and the closed-loop control arrangement are provided in conjunction with the power assembly.

Lastly, the present invention also provides a method for closed-loop control of a power assembly including an internal combustion engine and a generator having an operative drive connection to the internal combustion engine. Within the scope of the method, a generator power of the generator is detected as a controlled variable, a power control deviation is determined as the difference between the detected generator power and a target generator power, and a first preset variable is determined as a manipulated variable for controlling the internal combustion engine as a function of the power control deviation. In addition, a generator frequency of the generator is detected as a controlled variable, a frequency control deviation is determined as the difference between the detected generator frequency and a target generator frequency, and a second preset variable is determined as a manipulated variable for controlling the internal combustion engine as a function of the frequency control deviation. In a first functional state, the first preset variable is used as a control preset variable for controlling the internal combustion engine. In a second functional state, the second preset variable is used as the control preset variable for controlling the internal combustion engine. At least one controller component is calculated for the first preset variable and for the second preset variable—in particular always—independently of the current functional state. In particular, the advantages which have already been explained in conjunction with the closed-loop control device, the closed-loop control arrangement and the power assembly are provided in conjunction with the method. Optionally, the method includes at least one method step which has been explicitly or implicitly explained in conjunction with the closed-loop control device, the closed-loop control arrangement and/or the power assembly.

The at least one controller component is optionally selected here from a group consisting of a proportional component and a differential component.

Optionally, the preset variable calculated by the currently controlling controller, selected from the frequency controller and the power controller, for initialization is transferred to a currently non-controlling controller, selected from the power controller and the frequency controller, of which the assigned preset variable is not used as a control preset variable in the current functional state of the switchover module, before switching to a subsequent functional state.

Optionally, an initialization variable for the initialization of the non-controlling controller is calculated from the transferred preset variable on the basis of the at least one controller component calculated by the non-controlling controller.

Optionally, an integral component of the non-controlling controller is initialized with the initialization variable.

Optionally, a target torque or a target speed is calculated as the first preset variable and as the second preset variable. Optionally, the same physical variable is generally calculated for both preset variables; the same type of preset variable is therefore used both for power control and for frequency control.

Switching between the first functional state and the second functional state is optionally parameter-dependent, or alternately, in particular cyclical, or is performed according to a predetermined sequence, in particular according to a predetermined pattern.

Optionally, a preset variable additional term is calculated from the target generator power by way of a calculation element having differential transfer behavior, in particular a D element or a $DT_1$ element, and the preset variable additional term is offset against a precursor preset variable, optionally added to the precursor preset variable, in order to obtain the first preset variable.

BRIEF DESCRIPTION OF THE DRAWINGS

The invention will be explained in more detail below with reference to the drawing, in which: The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrate embodiments of the invention, and such exemplifications are not to be construed as limiting the scope of the invention in any manner.

DETAILED DESCRIPTION OF THE INVENTION

Figure 1:
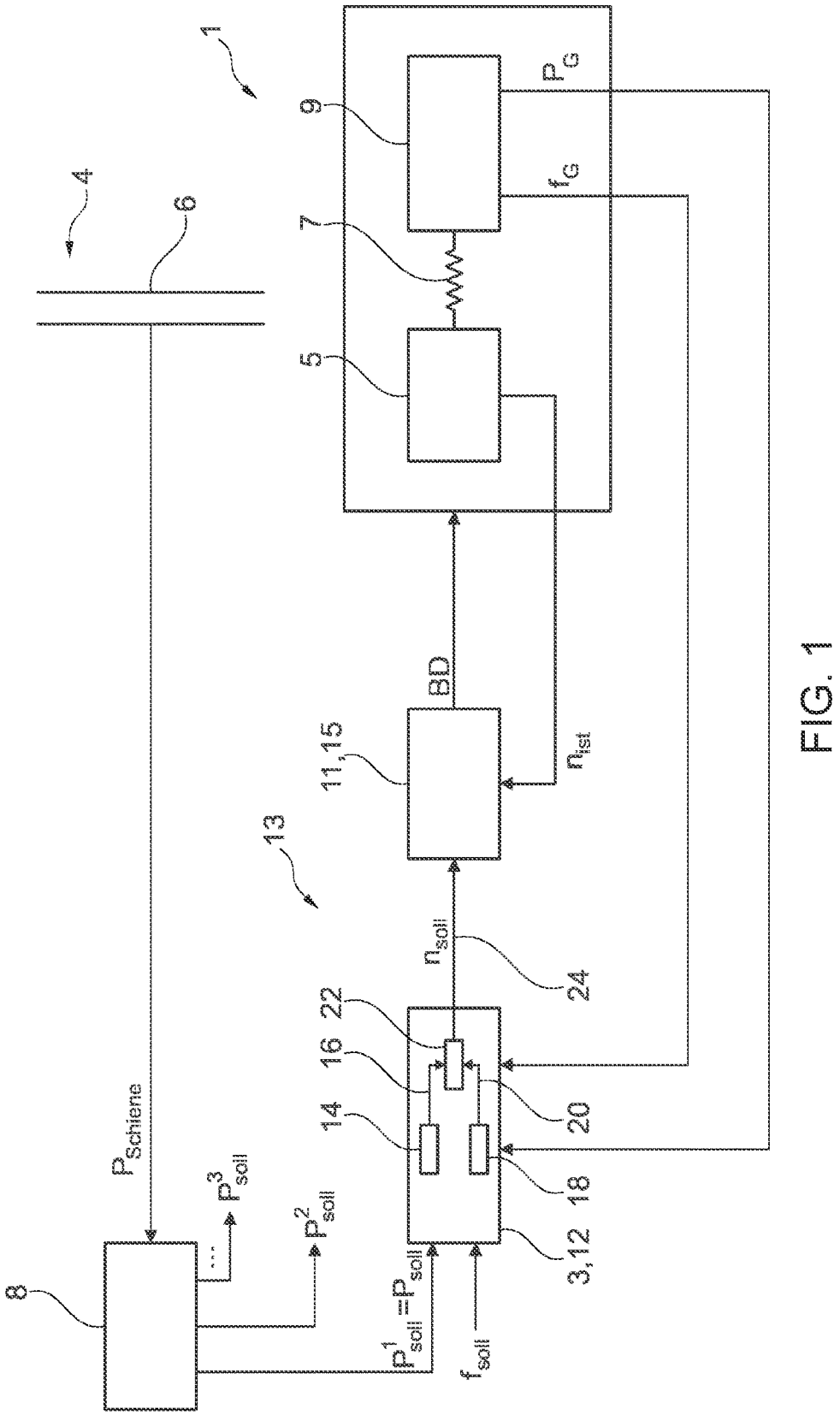
FIG. 1 shows a schematic representation of a first exemplary embodiment of a power assembly with a first exemplary embodiment of a closed-loop control arrangement and a first exemplary embodiment of a closed-loop control device.

FIG. 1 shows a schematic representation of a first exemplary embodiment of a power assembly 1 with a first exemplary embodiment of a closed-loop control arrangement 13 and a first exemplary embodiment of a closed-loop control device 3. The power assembly 1 in this exemplary embodiment is part of a higher-level network of a multiplicity of power assemblies, of which only the one power assembly 1 considered in greater detail here is shown. In particular, the power assembly 1 is electrically connected to a power grid 4, here specifically to a busbar 6. In particular, the power assembly 1 can be operated in island parallel operation or in grid parallel operation; in particular, the power grid 4 can be a local power grid, in particular an on-board electrical system of a vehicle, for example a ship, or a supra-regional power grid. An external open-loop control unit 8 is assigned to the power grid 4 and distributes a total power $P_{Schiene}$ requested at the busbar 6, which is also referred to as the total load, across the individual power assemblies 1, in particular by calculating a separate target generator power $$P_{soll}^1, P_{soll}^2, P_{soll}^3,$$

etc. for each power assembly 1. A first target generator power $$P_{soll}^1$$

assigned to the power assembly 1 specifically shown here is referred to in the following as the target generator power $P_{soll}$ for short for the sake of simplicity.

However, the power assembly 1 can also be operated in isolation.

It is also possible that the power distribution is not carried out in an external open-loop control unit 8, but in the closed-loop control device 3 itself, in particular in a master closed-loop control device of one of the power assemblies 1, wherein the other closed-loop control devices 3 of the other power assemblies 1 are then optionally operated as slave closed-loop control devices, which receive their respective target generator power from the master closed-loop control device.

The power assembly 1 has an internal combustion engine 5 and a generator 9 which has an operative drive connection to the internal combustion engine 5 via a shaft 7 shown schematically. The closed-loop control device 3 is operatively connected to the internal combustion engine 5 on the one hand and to the generator 9 on the other. In particular, the generator 9 is electrically connected to the busbar 6 in a manner not presented explicitly here.

In particular, the closed-loop control device 3 is set up (compare also FIG. 4 in this regard) for closed-loop control of the power assembly 1, wherein it has a power controller 14 which is set up to detect a generator power $P_G$ of the generator 9 as a first controlled variable, to determine a power control deviation $e_P$ as the difference between the detected generator power $P_G$ and the target generator power $P_{soll}$, and to determine a preset variable 16 as a manipulated variable for controlling the internal combustion engine 5 as a function of the power control deviation $e_P$. In addition, the closed-loop control device 3 has a frequency controller 18, which is set up to detect a generator frequency $f_G$ of the generator 9 as a second controlled variable, to determine a frequency control deviation $e_f$ as the difference between the detected generator frequency $f_G$ and the target generator frequency $f_{soll}$, and to determine a second preset variable 20 as a manipulated variable for controlling the internal combustion engine 5 as a function of the frequency control deviation $e_f$. The closed-loop control device 3 also has a switchover module 22, which is set up to use the first preset variable 16 as a control preset variable 24 for controlling the internal combustion engine 5 in a first functional state of the switchover module 22, and to use the second preset variable 20 as the control preset variable 24 for controlling the internal combustion engine 5 in a second functional state of the switchover module 22. The power controller 14 and the frequency controller 18 are set up to always calculate at least one controller component for the respectively assigned preset variable 16, 20 during operation of the closed-loop control device 3, independently of the current functional state of the switchover module 22.

The closed-loop control device 3 enables a defined, clear and robust control strategy for the closed-loop control of both the generator frequency and the generator power. The switchover module 22 is used here to decide at any time whether the frequency controller 18 or the power controller 14 takes over control of the internal combustion engine 5 as the currently controlling controller. The switchover module 22 also allows the hierarchy of the controllers to be clearly specified. Advantageously, at least one variable to be transferred between the controllers immediately before the switchover can be determined, by way of which undesirable jumps in the control of the internal combustion engine 5 can be avoided during the switchover. This can be advantageously designed in such a way that the controller currently controlling immediately after the switchover calculates the preset variable 16, 20 assigned to it in the sampling step immediately following the switchover—in the case of discrete-time sampling—as if it had also been the controller currently controlling in the immediately preceding sampling step, that is to say immediately before the switchover.

In the first exemplary embodiment shown here, the control preset variable 24—and correspondingly also each of the preset variables 16, 20—is in particular a target speed $n_{soll}$.

The closed-loop control device 3 is designed as a generator controller 12 according to the first exemplary embodiment shown here and is operatively connected to an open-loop control device 11 of the internal combustion engine 5 in such a way that the target preset variable 24 can be transmitted from the closed-loop control device 3 to the open-loop control device 11. This also enables, at the same time, particularly robust power control and versatile use of the closed-loop control device 3, in particular with a multiplicity of power assemblies 1.

The closed-loop control device 3 and the open-loop control device 11 together form the closed-loop control arrangement 13 for control of the power assembly 1. The open-loop control device 11 is optionally designed as an engine controller, in particular as an engine control unit (ECU).

The open-loop control device 11 also has the target speed $n_{soll}$ and a detected speed $n_{ist}$ as input variables. From this, the open-loop control device 11 calculates a speed control deviation. Lastly, the open-loop control device 11 uses this speed control deviation to calculate an energization duration BD for controlling the fuel injection valves of the internal combustion engine 5. Optionally, the open-loop control device 11 first calculates a target torque $M_{soll}$ from the speed control deviation and, from this, in turn, the energization duration BD.

A speed controller is optionally activated in the open-loop control device 11 if the target speed $n_{soll}$ is calculated as the control preset variable 24.

Figure 2:
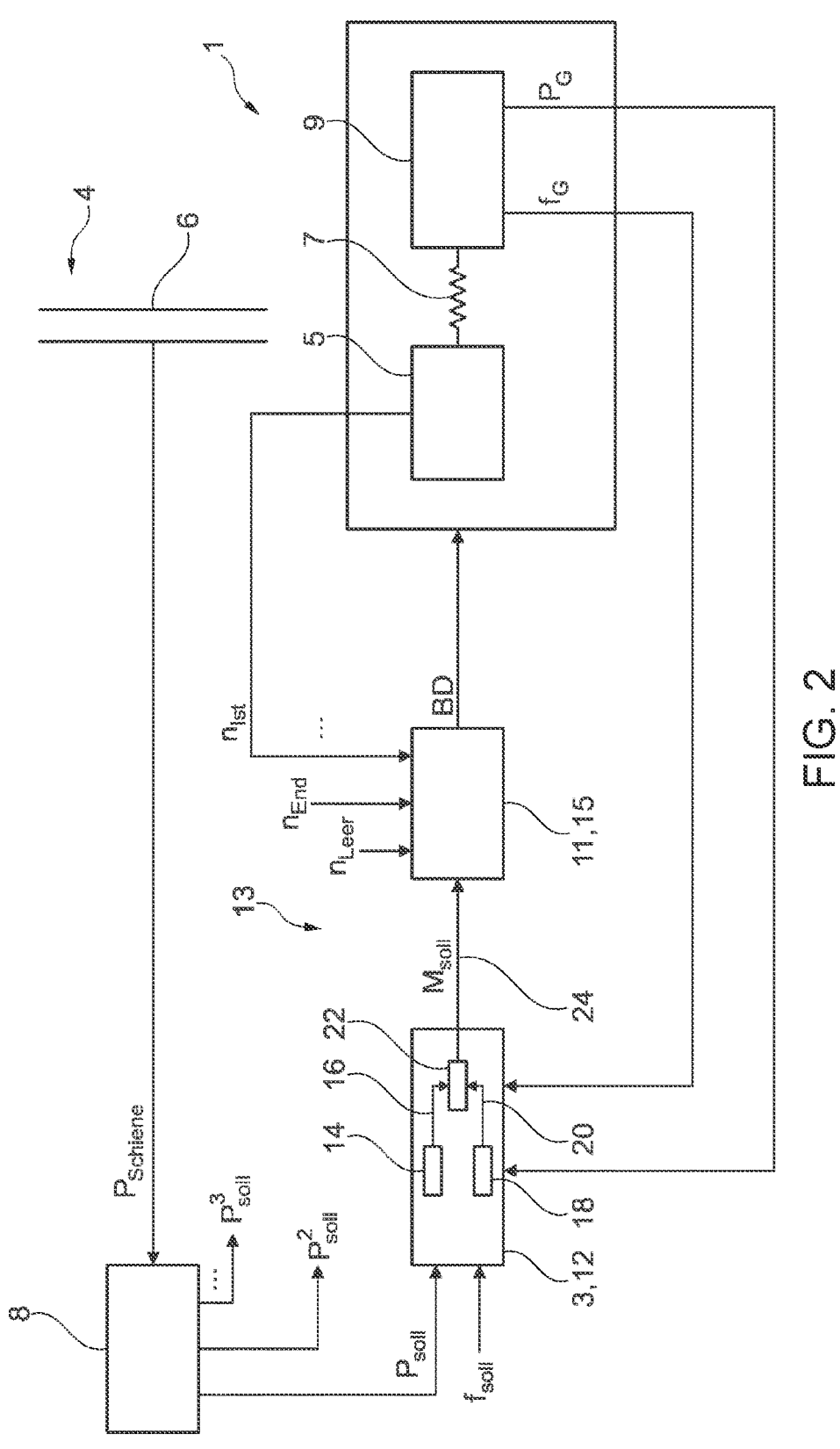
FIG. 2 shows a schematic representation of a second exemplary embodiment of a power assembly with a second exemplary embodiment of a closed-loop control arrangement and a second exemplary embodiment of a closed-loop control device.

FIG. 2 shows a schematic representation of a second exemplary embodiment of a power assembly 1 with a second exemplary embodiment of a closed-loop control arrangement 13 and a second exemplary embodiment of a closed-loop control device 3.

Like and functionally similar elements are provided with the same reference signs in all figures, and therefore reference is made to the previous description in each case.

This second exemplary embodiment differs from the first exemplary embodiment according to FIG. 1 in particular in that the control preset variable 24 here is not a target speed $n_{soll}$, but rather a target torque $M_{soll}$ is calculated and transferred to the open-loop control device 11.

A speed controller of the open-loop control device 11 is optionally deactivated in this case. Optionally, a final idling speed controller of the open-loop control device 11 is activated. This is used to control the speed of the internal combustion engine 5 if the detected speed $n_{ist}$ falls below a lower speed limit $n_{Leer}$ or exceeds an upper speed limit $n_{End}$. Between these speed limits, a target torque calculated in the open-loop control device 11 is equal to the target torque $M_{soll}$ specified by the closed-loop control device 3. In particular, a torque specification is activated in the open-loop control device 11.

Figure 3:
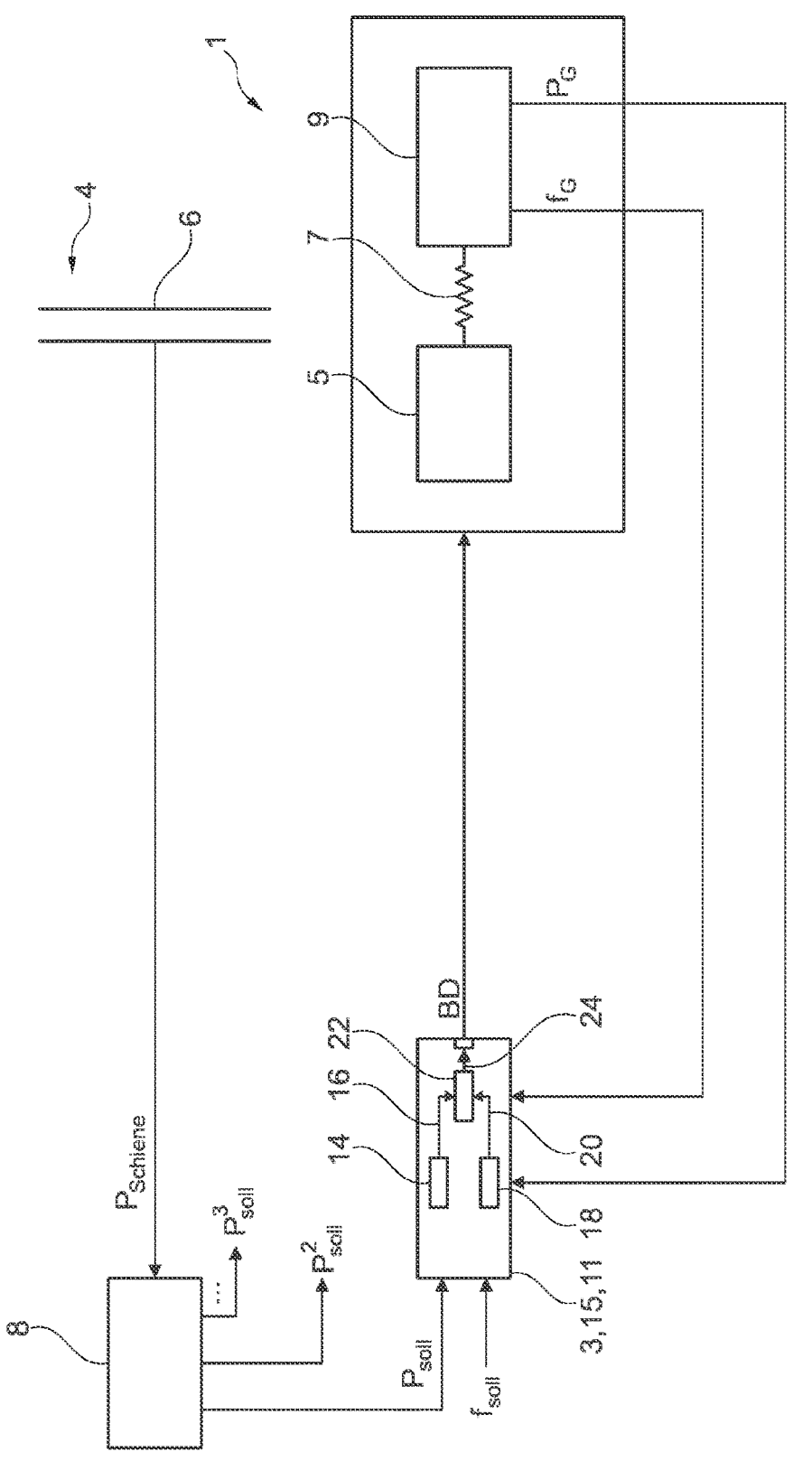
FIG. 3 shows a schematic representation of a third exemplary embodiment of a power assembly with a third exemplary embodiment of a closed-loop control device.

FIG. 3 shows a schematic representation of a third exemplary embodiment of a power assembly 1 with a third exemplary embodiment of a closed-loop control device 3. In this exemplary embodiment the closed-loop control device 3 is designed as an open-loop control device 11, here specifically an engine controller 15, for direct, in particular immediate control of the internal combustion engine 5. In particular, the closed-loop control device 3 is set up to calculate an energization duration BD for controlling the injectors of the internal combustion engine 5 from the control preset variable 24, in particular the target speed $n_{soll}$ or the target torque $M_{soll}$.

Figure 4:
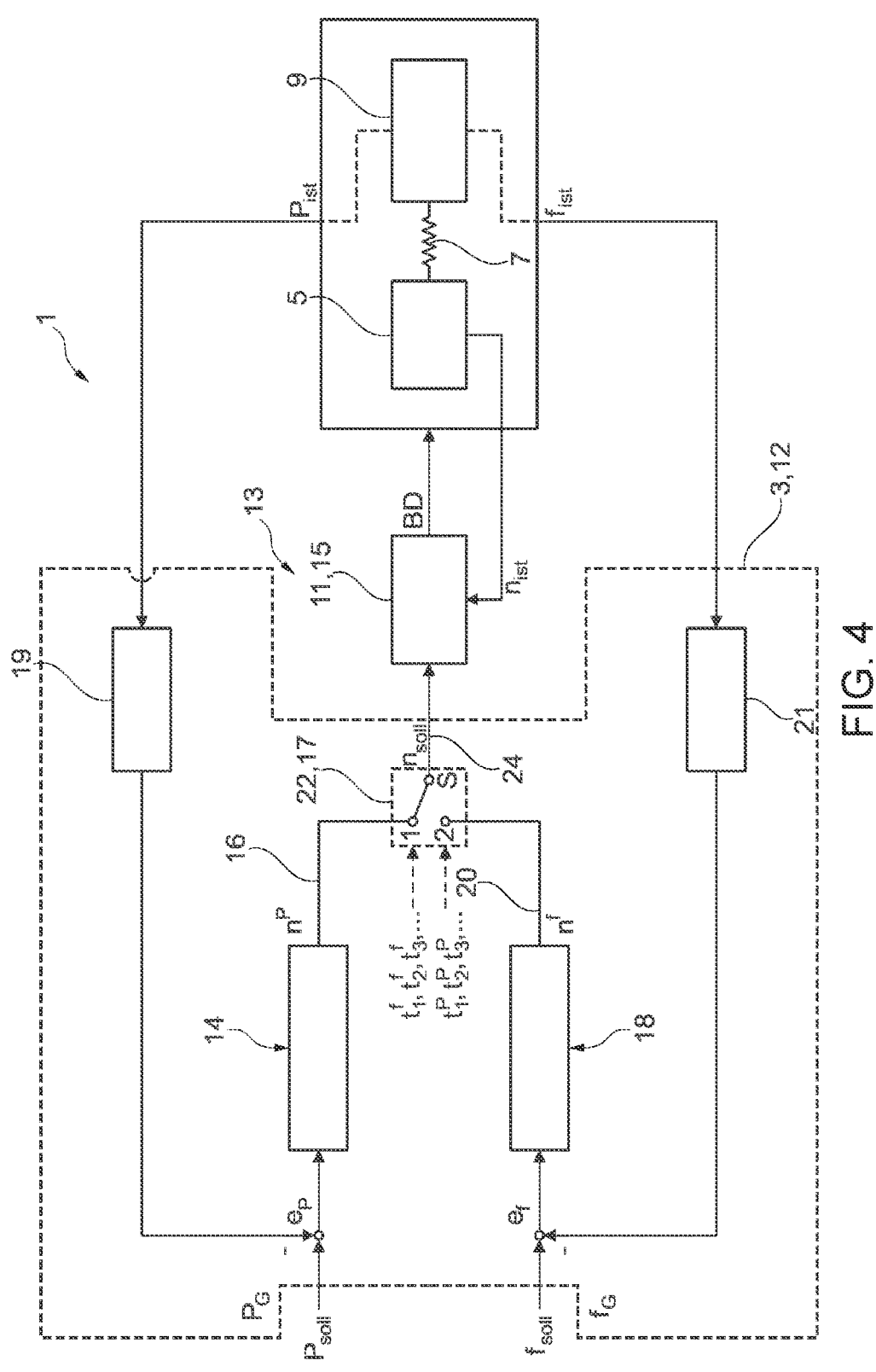
FIG. 4 shows a first schematic detailed representation of the first exemplary embodiment of the power assembly.

FIG. 4 shows a first schematic detailed representation of the first exemplary embodiment of the power assembly 1 according to FIG. 1.

In this respect, the further mode of operation of the closed-loop control device 3 in particular is explained in conjunction with the first exemplary embodiment according to FIG. 1. However, the mode of operation explained below is equally applicable to the other exemplary embodiments according to FIGS. 2 and 3. In this respect, the target speed $n_{soll}$ is also used in the following, in particular by way of example, as the control preset variable 24. However, the logic and functionality explained for calculating the control preset variable 24 can also be used if the target torque $M_{soll}$ is used as the control preset variable 24.

The switchover module 22 is shown here as the first switch 17, wherein the first functional state of the switchover module 22 corresponds to the upper switch position of the first switch 17, and wherein the second functional state corresponds to the lower switch position of the first switch 17.

The switchover module 22 is optionally set up to switch between the first functional state and the second functional state parameter-dependently, or alternately, in particular cyclically, or according to a predetermined sequence. In particular, the switchover can take place equidistantly in time, optionally after each sampling step, or according to a predetermined prioritization of one of the controllers, optionally the power controller 14. For example, switching from the power controller 14 to the frequency controller 18, i.e., from the first functional state to the second functional state, only takes place after two sampling steps, wherein switching from the second functional state back to the first functional state, i.e., from the frequency controller 18 to the power controller 14, already takes place after one sampling step.

The closed-loop control device 3 is optionally set up to filter an instantaneous actual power $P_{ist}$ of the generator 9 in a power filter 19 and to use the filtered actual power $P_{ist}$ as the detected generator power $P_G$. According to an optional embodiment, the power filter 19 is a $PT_1$ filter or a mean value filter.

The closed-loop control device 3 is additionally set up to filter an instantaneous actual frequency $f_{ist}$ of the generator 9 in a frequency filter 21 and to use the filtered actual frequency $f_{ist}$ as the detected generator frequency $f_G$. According to an optional embodiment, the frequency filter 21 is a $PT_1$ filter or a mean value filter.

Figure 5:
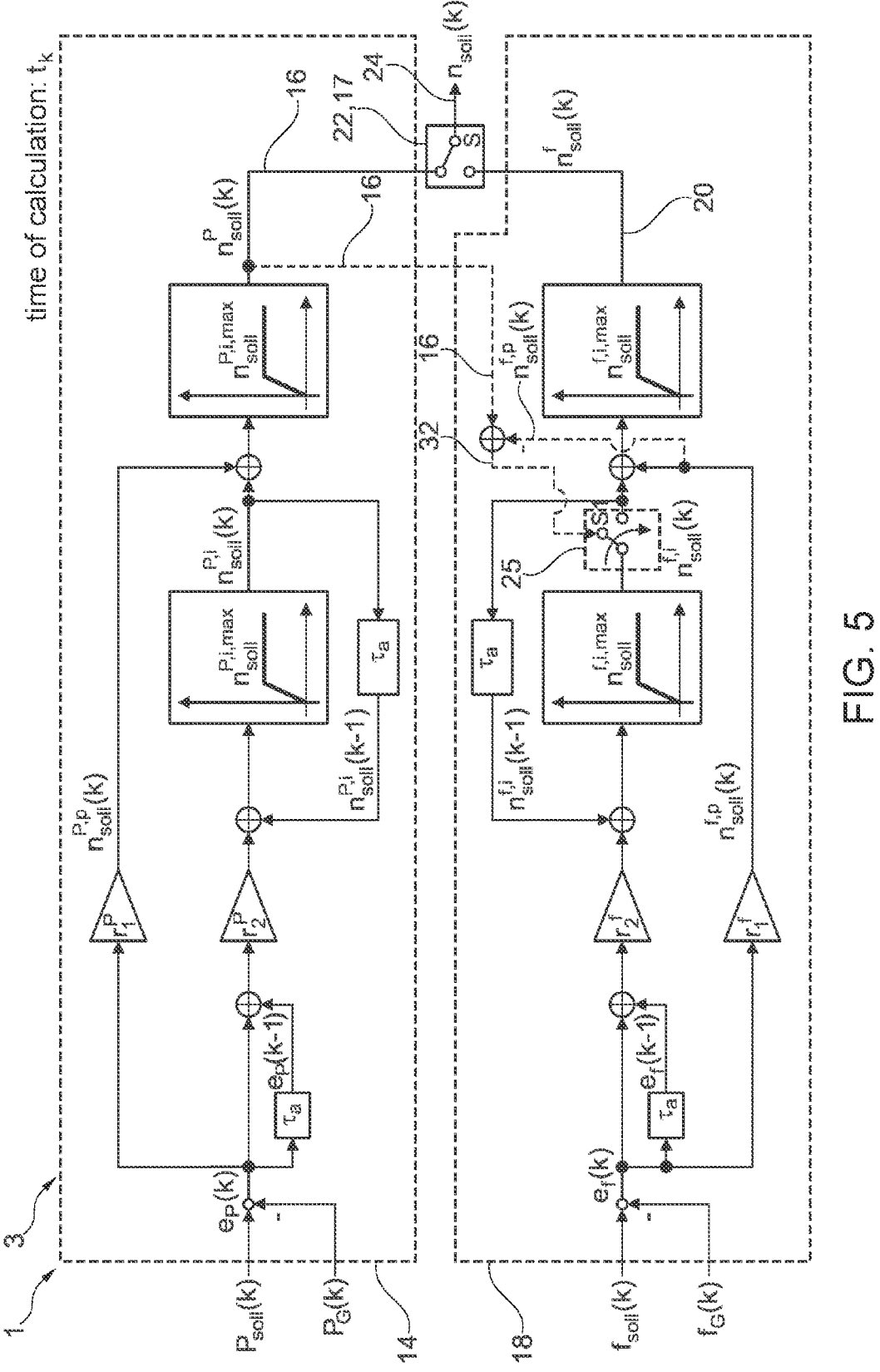
FIG. 5 shows a second schematic detailed representation of the exemplary embodiment of the power assembly in a first functional state.

FIG. 5 shows a second schematic detailed representation of the first exemplary embodiment of the power assembly 1 in the first functional state in a discrete-time representation, wherein the sampling steps are denoted by a running index. In both FIGS. 5 and 6, the index value of the running index indicated by k corresponds to a sampling step immediately before switching from the power controller 14, i.e., from the first functional state, to the frequency controller 18, i.e., to the second functional state. This means that the index value k corresponds to the last sampling step in the first functional state. Accordingly, the index value indicated by k+1 denotes the sampling step that immediately follows the switchover, i.e., the first sampling step in the second functional state. Accordingly, the index value indicated by k−1 denotes the sampling step immediately before the sampling step denoted by k. In particular, FIG. 5 shows the closed-loop control device 3 in its state at the time indicated by k.

Figure 6:
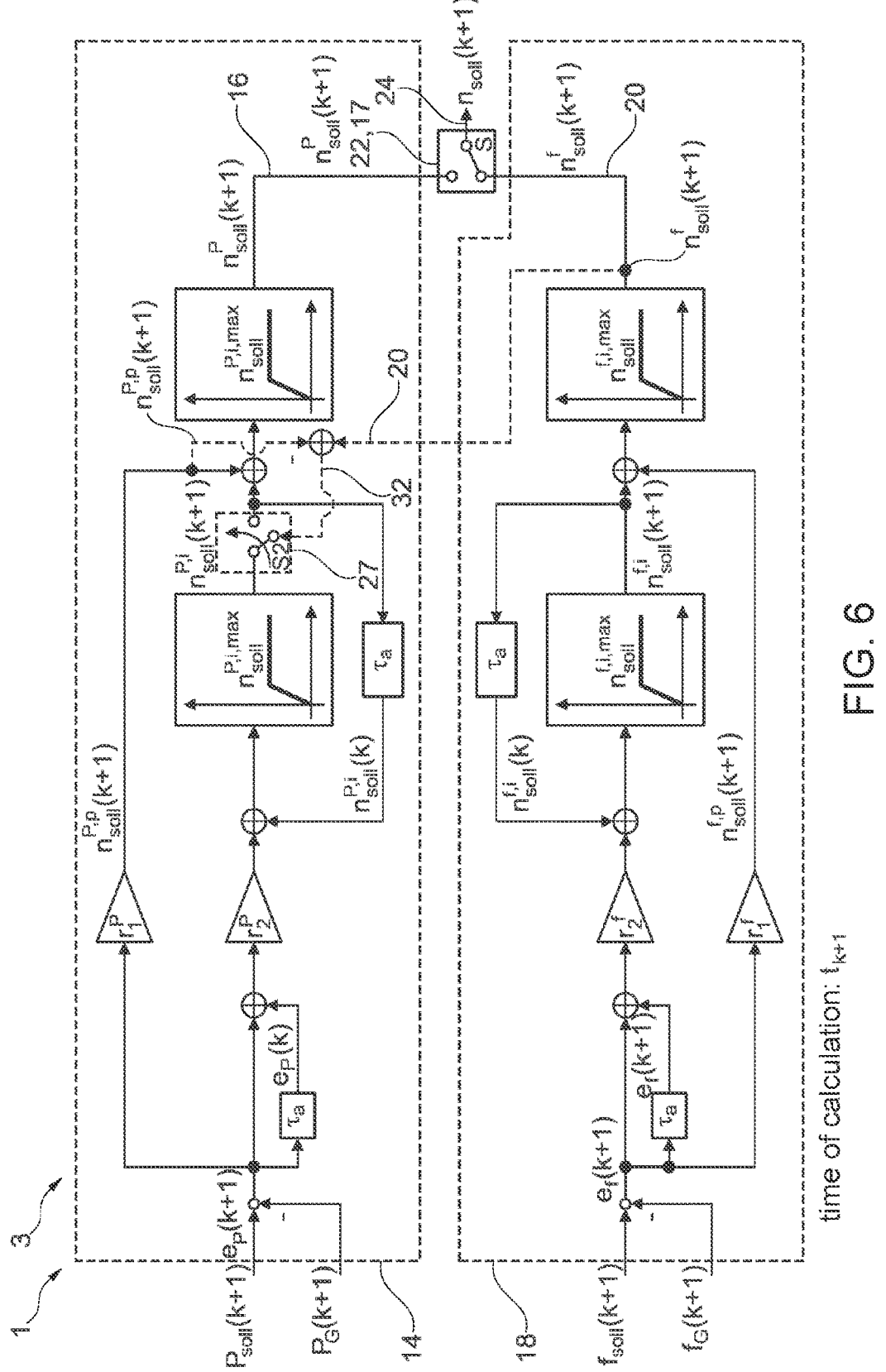
FIG. 6 shows a third schematic detailed representation of the first exemplary embodiment of the power assembly in a second functional state.

The control algorithms for the power controller 14 and the frequency controller 18 are designed as PI controllers in both FIGS. 5 and 6. Alternatively, however, it is also possible that at least one of the controllers, selected from the power controller 14 and the frequency controller 18, is designed as a PID controller or as a $PI(DT_1)$ controller.

The power controller 14 calculates the power control deviation $e_P(k)$ from the target generator power $P_{soll}(k)$ and the detected generator power $P_G(k)$ in the current sampling step k, and, from this, a power proportional component $$n_{soll}^{P,p}(k),$$

by multiplying the power control deviation $e_P(k)$ by a first power constant $$r_1^P.$$

The first power constant $$r_1^P$$

is optionally equal to an optionally parameterizable, i.e., predeterminable power proportional coefficient $$k_p^P.$$

The power controller 14 also calculates a power integral component $$n_{soll}^{P,i}(k)$$

at least in the first functional state, using the trapezoidal rule for integration by adding the power control deviation $e_P(k)$ of the current sampling step k to the power control deviation $e_P(k-1)$ of the previous sampling step k−1, wherein the sum thus formed is multiplied by a second power constant $$r_2^P,$$

wherein the product thus formed is added to the preceding power integral component $$n_{soll}^{P,i}(k-1)$$

delayed by one sampling step $\tau_a$, and wherein the sum formed in this way is delimited upward to a first, optionally parameterizable maximum value $$n_{soll}^{P,i,max}$$

and downward to a first, optionally parameterizable minimum value $$n_{soll}^{P,i,min}.$$

The power integral component $$n_{soll}^{P,i}(k)$$

calculated in this way is added to the power proportional component $$n_{soll}^{P,p}(k)$$

at least in the first functional state, wherein the sum formed in this way is in turn limited upward to a second maximum value, optionally to the first maximum value $$n_{soll}^{P,i,max},$$

and downward to a second minimum value, optionally to the first minimum value $$n_{soll}^{P,i,min}.$$

This results in the first preset variable 16, in this case the target speed $$n_{soll}^{P}(k)$$

of the power controller 14. In the first functional state, the first preset variable 16 is output by the switchover module 22 as a control preset variable 24.

The second power constant $$r_2^P$$

is optionally given by:

$$r_2^P = \frac{k_p^P \tau_a}{2\tau_N}, \tag{1}$$

with the parameterizable power proportional coefficient $$k_p^P,$$

the time width $\tau_a$ of a sampling step, and the parameterizable reset time $\tau_N$. The first maximum value $$n_{soll}^{P,i,max}$$

is optionally given by a nominal speed for the internal combustion engine 5 plus 200 min$^{-1}$. The first minimum value $$n_{soll}^{P,i,min}$$

optionally given by the nominal speed minus 200 min$^{-1}$.

The frequency controller 18 calculates the frequency control deviation $e_f(k)$ from the target generator frequency $f_{soll}(k)$ and the detected generator frequency $f_G(k)$ in the current sampling step k, and, from this, a frequency proportional component $$n_{soll}^{f,p}(k),$$

17

18 by multiplying the frequency control deviation $e_f(k)$ by a first frequency constant $$r_1^f.$$

The first frequency constant $$r_1^f$$

is optionally equal to an optionally parameterizable, i.e., predeterminable frequency proportional coefficient $$k_p^f.$$

The frequency controller 18 also calculates—not necessarily in the first functional state, but at least in the second functional state—a frequency integral component $$n_{soll}^{f,i}(k),$$

using the trapezoidal rule for integration by adding the frequency control deviation $e_f(k)$ of the current sampling step k to the frequency control deviation $e_f(k-1)$ of the previous sampling step k−1, wherein the sum thus formed is multiplied by a second frequency constant $$r_2^f,$$

wherein the product thus formed is added to the preceding frequency integral component $$n_{soll}^{f,i}(k-1)$$

delayed by one sampling step $\tau_a$, and wherein the sum formed in this way is delimited upward to a third, optionally parameterizable maximum value $$n_{soll}^{f,i,max}$$

and downward to a third, optionally parameterizable minimum value $$n_{soll}^{f,i,min}.$$

The frequency controller 18 is set up so that, at least in the second functional state, the thus calculated frequency integral component $$n_{soll}^{f,i}(k)$$

is added to the frequency proportional component $$n_{soll}^{f,p}(k)$$

and the sum thus formed is in turn limited upward to a fourth maximum value, optionally to the third maximum value $$n_{soll}^{f,i,max},$$

and downward to a fourth minimum value, optionally to the third minimum value $$n_{soll}^{f,i,min}.$$

This then results in the second preset variable 20, in this case the target speed $$n_{soll}^f(k)$$

of the frequency controller 18.

The second frequency constant $$r_2^f$$

is optionally given by:

$$r_2^f = \frac{k_p^f \tau_a}{2\tau_N}, \quad (2)$$

with the parameterizable frequency proportional coefficient $$k_p^f,$$

the time width $\tau_a$ of a sampling step, and the parameterizable reset time $\tau_N$. The third maximum value $$n_{soll}^{f,i,max}$$

is optionally given by the nominal speed plus 200 min$^{-1}$. The third minimum value $$n_{soll}^{f,i,min}$$

is optionally given by the nominal speed minus 200 min$^{-1}$.

In the first functional state, the power controller 14 calculates at least the power proportional component $$n_{soll}^{P,p}(k)$$

and the power integral component $$n_{soll}^{P,i}(k)$$

f it is designed as a PI controller, as shown here. If the power controller 14 is designed as a PID controller, it additionally calculates a power differential component in the first functional state. In the second functional state—compare FIG. 6 in this regard—the power controller 14 calculates at least the power proportional component $$n_{soll}^{P,p}(k),$$

especially if the power controller 14 is designed as a PI controller. If the power controller 14 is designed as a PID controller, it optionally calculates at least the power proportional component $$n_{soll}^{P,p}(k)$$

and the power differential component in the second functional state. It is possible that the power controller 14 does not calculate the power integral component $$n_{soll}^{P,i}(k)$$

in the second functional state. However, it is also possible that the power controller 14 also calculates the power integral component $$n_{soll}^{P,i}(k)$$

in the second functional state, wherein the power integral component $$n_{soll}^{P,i}(k)$$

is not used in the second functional state. In particular, it is possible that the power controller 14 does not calculate the first preset variable 16 in the second functional state, or that this is calculated but—at least due to the functional position of the switchover module 22—is not used, in particular is not forwarded as a control preset variable 24.

In the second functional state—compare FIG. 6 in this regard—the frequency controller 18 calculates at least the frequency proportional component $$n_{soll}^{f,p}(k)$$

and the frequency integral component $$n_{soll}^{f,i}(k)$$

if it is designed as a PI controller, as shown here. If the frequency controller 18 is designed as a PID controller, it additionally calculates a frequency differential component in the second functional state. In the first functional state—see FIG. 5 in this regard—the frequency controller 18 calculates at least the frequency proportional component $$n_{soll}^{f,p}(k),$$

especially if the frequency controller 18 is designed as a PI controller. If the frequency controller 18 is designed as a PID controller, it optionally calculates at least the frequency proportional component $$n_{soll}^{f,p}(k)$$

and the frequency differential component in the first functional state. It is possible that the frequency controller 18 does not calculate the frequency integral component $$n_{soll}^{f,i}(k)$$

in the first functional state. However, it is also possible that the frequency controller 18 also calculates the frequency integral component $$n_{soll}^{f,i}(k)$$

in the first functional state, wherein the frequency integral component $$n_{soll}^{f,i}(k)$$

is not used in the first functional state. In particular, it is possible that the frequency controller 18 does not calculate the second preset variable 20 in the first functional state, or that this is calculated but—at least due to the functional position of the switchover module 22—is not used, in particular is not forwarded as a control preset variable 24.

The closed-loop control device 3 is set up to transfer the preset variable 16, 20 calculated by the controlling controller, selected from the frequency controller 18 and the power controller 14, to a non-controlling controller, selected from the power controller 14 and the frequency controller 18, of which the assigned preset variable 16, 20 is not used as a control preset variable in a current functional state of the switchover module 22, for initialization before the switchover module 22 switches to a subsequent functional state. Specifically, the power controller 14 controlling in the sampling step denoted by the index value k in the first functional state transfers the first preset variable 16 to the non-controlling frequency controller 18 for initialization immediately before the switchover.

The closed-loop control device 3 is further set up to calculate an initialization variable 32 for the initialization of the non-controlling controller from the transferred preset variable 16, 20 on the basis of the at least one controller component calculated by the non-controlling controller. Specifically, the frequency proportional component $$n_{soll}^{f,p}(k)$$

calculated by the non-controlling frequency controller 18 is subtracted from the first preset variable 16, and the difference thus formed is used as the initialization variable 32 for initializing the frequency controller 18.

In particular, the closed-loop control device 3 is set up to initialize the integral component of the non-controlling controller with the initialization variable 32. The difference between the first preset variable 16 and the frequency proportional component $$n_{soll}^{f,p}(k)$$

is thus used in the first functional state to initialize the frequency controller 18, which is symbolically represented here by a second switch 25.

If the frequency controller 18 is designed as a PID controller, the frequency differential component is optionally subtracted from the first preset variable 16 in addition to the frequency proportional component $$n_{soll}^{f,p}(k)$$

in order to calculate the initialization variable 32.

In this procedure, a hypothetical second preset variable 20 calculated in the sampling step denoted by the index value k, which is the sum of the initialization variable 32 and the frequency proportional component $$n_{soll}^{f,p}(k)$$

and possibly also the frequency differential component—corresponds to the value that would have resulted if the second preset variable 20 had been calculated regularly by the frequency controller 18 at the same point in time. In particular, this hypothetical second preset variable 20 would optionally have the same value as the first preset variable 16 actually calculated by the power controller 14 in the sampling step denoted by the index value k. Starting from the initialization variable 32, the actual second preset variable 20 and thus also the control preset variable 24 is then calculated in the next sampling step designated by the index value k+1 (compare FIG. 6).

FIG. 6 shows a third schematic detailed representation of the first exemplary embodiment of the power assembly 1 according to FIG. 5, but now in the second functional state, again in the discrete-time representation. The index value of the running index indicated by k+1 now denotes the sampling step shown in FIG. 6 immediately after switching from the power controller 14, i.e., from the first functional state, to the frequency controller 18, i.e., to the second functional state. This means that the index value k+1 corresponds to the first sampling step in the second functional state.

The second preset variable 20 is now forwarded by the switchover module 22 as the control preset variable 24, i.e., the frequency controller 18 is now the controlling controller. The preceding frequency integral component $$n_{soll}^{f,i}(k),$$

which is delayed by one sampling step $\tau_a$, used to calculate the frequency integral component $$n_{soll}^{f,i}(k+1)$$

is now the initialization variable 32 from the previous sampling step denoted by the index value k, i.e., in this case specifically the difference between the preset variable 16 in sampling step k and the frequency proportional component $$n_{soll}^{f,p}(k).$$

This advantageously enables a smooth transition from power control to frequency control.

At the same time, the frequency controller 18 controlling in the sampling step, denoted by the index value k+1, in the second functional state now transfers the second preset variable 20 to the non-controlling power controller 14 for initialization. The power proportional component $$n_{soll}^{P,p}(k+1)$$

calculated by the non-controlling power controller 14 is subtracted from the second preset variable 20, and the difference thus formed is now used as the initialization variable 32 for initializing the power controller 14. In particular, the integral component of the non-controlling power controller 14 is initialized with the initialization variable 32. The difference between the second preset variable 20 and the power proportional component $$n_{soll}^{P,p}(k+1)$$

is thus used in the second functional state to initialize the power controller 14, which is symbolically represented here by a third switch 27.

If the power controller 14 is designed as a PID controller, the power differential component is optionally subtracted from the second preset variable 20 in addition to the power proportional component $$n_{soll}^{P,p}(k+1)$$

in order to calculate the initialization variable 32.

In this procedure, a hypothetical first preset variable 16 calculated in the sampling step denoted by the index value k+1, which is the sum of the initialization variable 32 and the power proportional component $$n_{soll}^{P_s p}(k+1)$$

—and possibly also the power differential component—corresponds to the value that would have resulted if the first preset variable 16 had been calculated regularly by the power controller 14 at the same point in time. In particular, this hypothetical first preset variable 16 would optionally have the same value as the second preset variable 20 actually calculated by the frequency controller 18 in the sampling step denoted by the index value k+1. Starting from the initialization variable 32, the actual first preset variable 16 and thus also the control preset variable 24 is then calculated again in a next sampling step denoted by the index value k+2 according to one embodiment. In this way, an interference-free transition from frequency control to power control is also made possible.

Otherwise, the power controller 14 and the frequency controller 18 operate as explained in conjunction with FIG. 5.

Overall, the initialization strategy proposed here for the respective integral components of the frequency controller 18 on the one hand and the power controller 14 on the other enables a smooth transition between the two control modes.

The procedure shown in FIGS. 5 and 6 is optionally continued iteratively.

Figure 7:
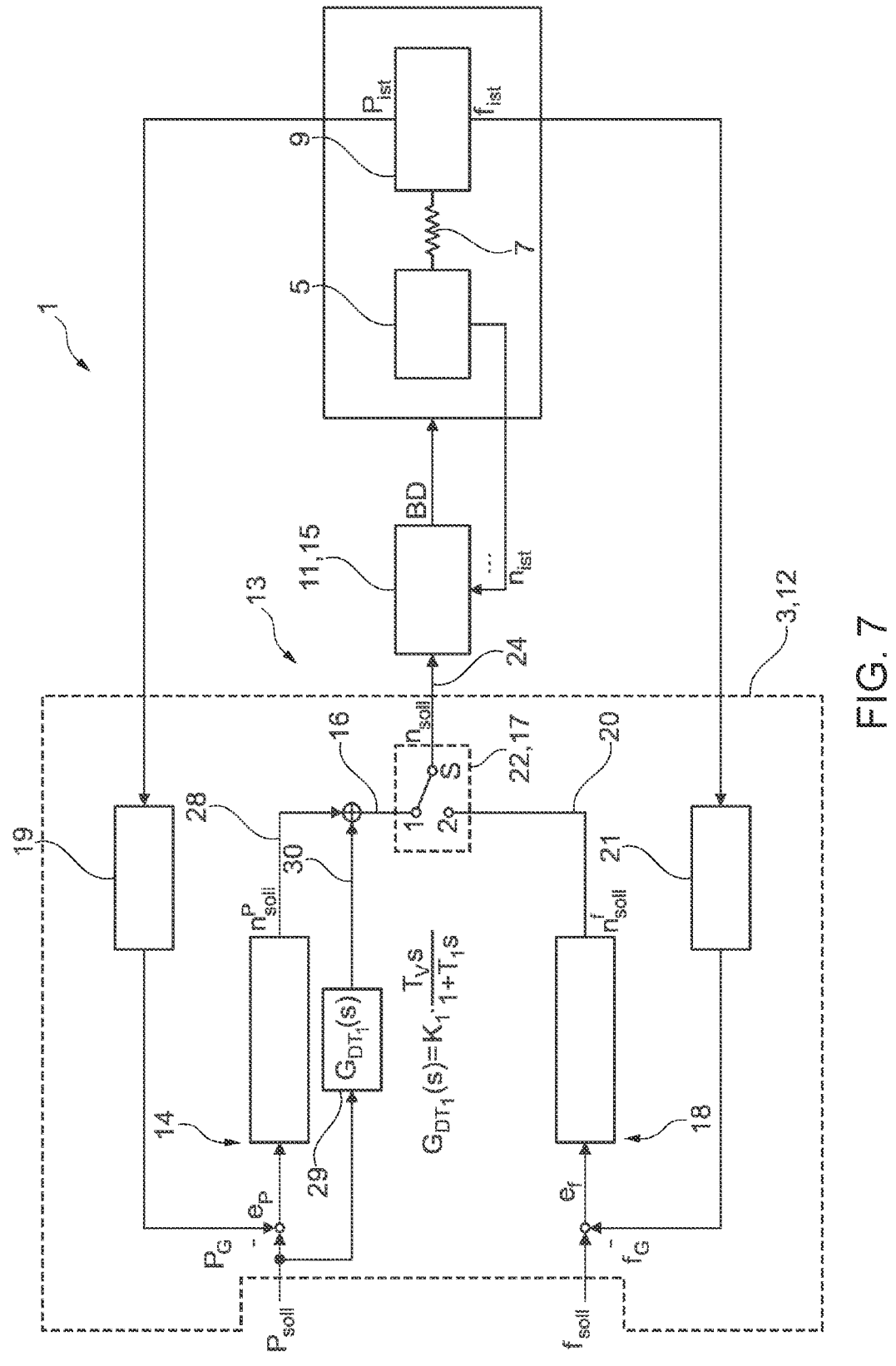
FIG. 7 shows a schematic representation of a fourth exemplary embodiment of a power assembly with a third exemplary embodiment of a closed-loop control arrangement and a fourth exemplary embodiment of a closed-loop control device.

FIG. 7 shows a schematic representation of a fourth exemplary embodiment of a power assembly 1 with a third exemplary embodiment of the closed-loop control arrangement 13 and a fourth exemplary embodiment of the closed-loop control device 3. The closed-loop control device 3 is shown here by way of example as a higher-level generator controller 12; however, the embodiment explained in conjunction with FIG. 7 can also be implemented in a closed-loop control device 3 designed as an engine controller 15 in another embodiment of the present invention.

The power controller 14 does not directly calculate the first preset variable 16 here, but instead calculates a precursor preset variable 28. The closed-loop control device 3 is set up to calculate a preset variable additional term 30 from the target generator power Paoli by way of a calculation element 29, which has a differential transmission behavior, and to offset the preset variable additional term 30 with the precursor preset variable 28 calculated by the power controller 14 in order to obtain the first preset variable 16. In particular, the closed-loop control device 3 is set up to add the preset variable additional term 30 to the precursor preset variable 28 in order to obtain the first preset variable 16. In the exemplary embodiment shown here, the calculation element 29 is a $DT_1$ element. Alternatively, however, it is also possible for the calculation element 29 to be designed as a D-element in another exemplary embodiment.

The target power $P_{soll}$ is thus amplified by the calculation element 29 and—in the exemplary embodiment shown here—superimposed additively on the output of the power controller 14, i.e., the precursor preset variable 28. In this way, the closed-loop control device 3 has an improved, in particular more dynamic load switching behavior.

The embodiment shown here has the advantage—over an embodiment in which the power controller 14 would have an overall PI(DT_1) characteristic—that only the target power $P_{soll}$ is amplified and not the power control deviation $e_P$. If instead a power controller 14 were used that has an overall PI(DT_1) characteristic, the dynamics of the power control would depend on the design of the power filter 19. If, for example, a $PT_1$ power filter with a small time constant $T_1$ were selected, this, in combination with the PI(DT_1) characteristic of the power controller 14, would lead to a delayed adaptation to a sudden change in the target generator power $P_{soll}$. Specifically, the detected generator power $P_G$ is subtracted from this, and then also changes rapidly when the load changes, in particular fed from the reserve of kinetic energy, in particular rotational energy, of the system consisting of the generator 9, the coupling 7 and the internal combustion engine 5. In particular, the actual generator power $P_{ist}$ follows an electrical load change almost instantaneously. This means that the target generator power $P_{soll}$ and the detected generator power $P_G$ change in the same effective direction, so that the power change is only attenuated in the power control deviation $e_P$. The resulting delay is advantageously avoided if—as shown in FIG. 7—the target generator power $P_{soll}$ is fed directly to the calculation element 29.

The calculation element 29 optionally has the following transfer function:

$$G_{DT_1}(s) = K_1 \frac{T_V s}{1 + T_1 s}, \tag{3}$$

with a factor $K_1$, the lead time $T_V$ and the delay time $T_1$. The calculation element 29 is only effective transiently, i.e., only in the event of a load change. The preset variable additional term 30 also changes abruptly in the event of a sudden load change and then finally decays to zero. In a steady state, the preset variable additional term 30 is zero. How quickly the preset variable additional term 30 decays depends on the delay time $T_1$. The factor $K_1$ is used in particular to convert the physical unit of the input variable, i.e., the target generator power $P_{soll}$, into the physical unit of the power variable, i.e., of the preset variable additional term 30, in particular a target speed or a target torque.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A closed-loop control device for closed-loop control of a power assembly including an internal combustion engine and a generator having an operative drive connection to the internal combustion engine, the closed-loop control device comprising:

a power controller which is configured for:

detecting a generator power ($P_G$) of the generator as a controlled variable;

determining a power control deviation ($e_P$) as a difference between the generator power ($P_G$) which is detected and a target generator power ($P_{soll}$); and determining a first preset variable as a manipulated variable for controlling the internal combustion engine as a function of the power control deviation ($e_P$);

a frequency controller which is configured for:

detecting a generator frequency ($f_G$) of the generator as a controlled variable;

determining a frequency control deviation ($e_f$) as a difference between the generator frequency ($f_G$) which is detected and a target generator frequency ($f_{soll}$);

determining a second preset variable as a manipulated variable for controlling the internal combustion engine as a function of the frequency control deviation ($e_f$); and a switchover module which is configured for:

using, in a first functional state of the switchover module, the first preset variable as a control preset variable for controlling the internal combustion engine;

using, in a second functional state of the switchover module, the second preset variable as a control preset variable for controlling the internal combustion engine;

wherein the power controller and the frequency controller are configured for calculating at least one controller component for a respectively assigned preset variable during operation of the closed-loop control device, independently of a current functional state of the switchover module.

2. The closed-loop control device according to claim 1, wherein the at least one controller component is selected from a group consisting of a proportional component and a differential component.

3. The closed-loop control device according to claim 1, wherein the closed-loop control device is configured for transferring the respectively assigned preset variable determined by a controlling controller—selected from the power controller and the frequency controller—to a non-controlling controller—selected from the power controller and the frequency controller—for an initialization before the switchover module switches over.

4. The closed-loop control device according to claim 3, wherein the closed-loop control device is configured for calculating an initialization variable for the initialization of the non-controlling controller from the respectively assigned preset variable—which is transferred—based on the at least one controller component calculated by the non-controlling controller.

5. The closed-loop control device according to claim 4, wherein the closed-loop control device is configured for initializing an integral component of the non-controlling controller with the initialization variable.

6. The closed-loop control device according to claim 1, wherein the closed-loop control device is configured for determining, as the first preset variable and as the second preset variable respectively, a target torque ($M_{soll}$) or a target speed ($n_{soll}$).

7. The closed-loop control device according to claim 1, wherein the closed-loop control device is formed as:

(a) an open-loop control device for directly controlling the internal combustion engine; or (b) a generator controller.

8. The closed-loop control device according to claim 7, wherein the closed-loop control device is formed as the generator controller with an interface to an open-loop control device of the internal combustion engine.

9. The closed-loop control device according to claim 1, wherein the switchover module is configured for switching between the first functional state and the second functional state parameter-dependently, alternately, or according to a predetermined sequence.

10. The closed-loop control device according to claim 9, wherein the switchover module is configured for switching between the first functional state and the second functional state alternately and thereby cyclically.

11. The closed-loop control device according to claim 1, wherein the closed-loop control device is configured for:

calculating a preset variable additional term from the target generator power ($P_{soll}$) by way of a calculation element having a differential transfer behavior; and offsetting the preset variable additional term against a precursor preset variable calculated by the power controller in order to obtain the first preset variable.

12. The closed-loop control device according to claim 11, wherein the closed-loop control device is configured for:

calculating a preset variable additional term from the target generator power ($P_{soll}$) by way of a calculation element having a differential transfer behavior; and offsetting the preset variable additional term against a precursor preset variable calculated by the power controller—in order to add the preset variable additional term to the precursor preset variable—in order to obtain the first preset variable.

13. A closed-loop control arrangement for closed-loop control of a power assembly including an internal combustion engine and a generator having an operative drive connection to the internal combustion engine, the closed-loop control arrangement comprising:

a closed-loop control device which is formed as a general controller, is for closed-loop control of the power assembly, and includes:

a power controller which is configured for:

detecting a generator power ($P_G$) of the generator as a controlled variable;

determining a power control deviation ($e_P$) as a difference between the generator power ($P_G$) which is detected and a target generator power ($P_{soll}$); and determining a first preset variable as a manipulated variable for controlling the internal combustion engine as a function of the power control deviation ($e_P$);

a frequency controller which is configured for:

detecting a generator frequency ($f_G$) of the generator as a controlled variable;

determining a frequency control deviation ($e_f$) as a difference between the generator frequency ($f_G$) which is detected and a target generator frequency ($f_{soll}$);

determining a second preset variable as a manipulated variable for controlling the internal combustion engine as a function of the frequency control deviation ($e_f$); and a switchover module which is configured for:

using, in a first functional state of the switchover module, the first preset variable as a control preset variable for controlling the internal combustion engine;

using, in a second functional state of the switchover module, the second preset variable as the control preset variable for controlling the internal combustion engine;

wherein the power controller and the frequency controller are configured for calculating at least one controller component for a respectively assigned preset variable during operation of the closed-loop control device, independently of a current functional state of the switchover module; and an open-loop control device operatively connected to the closed-loop control device for direct control of the internal combustion engine, the closed-loop control device being configured for transmitting the control preset variable to the open-loop control device.

14. A power assembly, comprising:

an internal combustion engine;

a generator including an operative drive connection to the internal combustion engine; and one of:

(a) a closed-loop control device for closed-loop control of the power assembly, the closed-loop control device including:

a power controller which is configured for:

detecting a generator power ($P_G$) of the generator as a controlled variable;

determining a power control deviation ($e_P$) as a difference between the generator power ($P_G$) which is detected and a target generator power ($P_{soll}$); and determining a first preset variable as a manipulated variable for controlling the internal combustion engine as a function of the power control deviation ($e_P$);

a frequency controller which is configured for:

detecting a generator frequency ($f_G$) of the generator as a controlled variable;

determining a frequency control deviation ($e_f$) as a difference between the generator frequency ($f_G$) which is detected and a target generator frequency ($f_{soll}$);

determining a second preset variable as a manipulated variable for controlling the internal combustion engine as a function of the frequency control deviation ($e_f$); and a switchover module which is configured for:

using, in a first functional state of the switchover module, the first preset variable (16) as a control preset variable for controlling the internal combustion engine;

using, in a second functional state of the switchover module, the second preset variable as the control preset variable for controlling the internal combustion engine;

wherein the power controller and the frequency controller are configured for calculating at least one controller component for a respectively assigned preset variable during operation of the closed-loop control device, independently of a current functional state of the switchover module; and (b) a closed-loop control arrangement for closed-loop control of the power assembly, the closed-loop control arrangement including:

a closed-loop control device which is formed as a general controller, is for closed-loop control of the power assembly, and includes:

a power controller which is configured for:

detecting a generator power ($P_G$) of the generator as a controlled variable;

determining a power control deviation ($e_P$) as a difference between the generator power ($P_G$) which is detected and a target generator power ($P_{soll}$); and determining a first preset variable as a manipulated variable for controlling the internal combustion engine as a function of the power control deviation ($e_P$);

a frequency controller which is configured for:

detecting a generator frequency ($f_G$) of the generator as a controlled variable;

determining a frequency control deviation ($e_f$) as a difference between the generator frequency ($f_G$) which is detected and a target generator frequency ($f_{soll}$);

determining a second preset variable as a manipulated variable for controlling the internal combustion engine as a function of the frequency control deviation ($e_f$);

a switchover module which is configured for:

using, in a first functional state of the switchover module, the first preset variable as a control preset variable for controlling the internal combustion engine;

using, in a second functional state of the switchover module, the second preset variable as the control preset variable for controlling the internal combustion engine;

wherein the power controller and the frequency controller are configured for calculating at least one controller component for a respectively assigned preset variable during operation of the closed-loop control device, independently of a current functional state of the switchover module; and an open-loop control device operatively connected to the closed-loop control device for direct control of the internal combustion engine, the closed-loop control device being configured for transmitting the control preset variable to the open-loop control device;

wherein the closed-loop control device or the closed-loop control arrangement is operatively connected to the internal combustion engine and the generator of the power assembly.

15. A method for closed-loop control of a power assembly including an internal combustion engine and a generator having an operative drive connection to the internal combustion engine, the method comprising the steps of:

detecting a generator power ($P_G$) of the generator as a controlled variable;

determining a power control deviation ($e_P$) as a difference between the generator power ($P_G$) which is detected and a target generator power ($P_{soll}$);

determining a first preset variable as a manipulated variable for controlling the internal combustion engine as a function of the power control deviation ($e_P$);

detecting a generator frequency ($f_G$) of the generator as a controlled variable;

determining a frequency control deviation ($e_f$) as a difference between the generator frequency ($f_G$) which is detected and a target generator frequency ($f_{soll}$);

determining a second preset variable as a manipulated variable for controlling the internal combustion engine as a function of the frequency control deviation ($e_f$);

using, in a first functional state, the first preset variable as a control preset variable for controlling the internal combustion engine;

using, in a second functional state, the second preset variable as a control preset variable for controlling the internal combustion engine;

calculating at least one controller component for the first preset variable and for the second preset variable, independently of the current functional state.

* * * * *